United States Patent
Knighton et al.

(10) Patent No.: US 6,530,550 B1
(45) Date of Patent: Mar. 11, 2003

(54) WIRELESS TURNTABLE

(75) Inventors: Mark S. Knighton, Santa Monica, CA (US); David S. Agabra, Pacific Palisades, CA (US); William D. McKinley, Los Angeles, CA (US); John Z. Zheng, San Gabriel, CA (US); David D. Drobnis, Mar Vista, CA (US); J. Douglas Logan, Cerritos, CA (US); Basel F. Bahhour, Riverside, CA (US); Jill E. Haynie, Santa Monica, CA (US); Kent E. Sidney, Los Angeles, CA (US)

(73) Assignee: NextEngine, Inc., Santa Monica, CA (US)

( * ) Notice: Subject to any disclaimer, the term of this patent is extended or adjusted under 35 U.S.C. 154(b) by 0 days.

(21) Appl. No.: 09/660,810

(22) Filed: Sep. 13, 2000

(51) Int. Cl.$^7$ ................................................ A47B 95/00
(52) U.S. Cl. ...................................... 248/349.1; 104/35
(58) Field of Search .................... 248/349.1, 346.06, 248/346.5, 651, 678; 104/44, 35; 343/757, 761

(56) References Cited

U.S. PATENT DOCUMENTS

| | | | | | |
|---|---|---|---|---|---|
| 3,025,066 A | * | 3/1962 | Siebert | ........................ | 274/39 |
| 3,286,266 A | * | 11/1966 | Barnes | ........................ | 343/761 |
| 3,918,777 A | | 11/1975 | Kitchin | ........................ | 308/201 |
| 3,944,307 A | | 3/1976 | Bingle | ........................ | 308/217 |
| 4,004,816 A | * | 1/1977 | Guha | ........................ | 274/10 R |
| 4,254,319 A | * | 3/1981 | Beh et al. | ............. | 219/10.55 F |
| 4,291,886 A | * | 9/1981 | Dennis et al. | ............... | 369/203 |
| 4,488,241 A | * | 12/1984 | Hutchins et al. | ............. | 364/513 |
| 4,501,164 A | * | 2/1985 | Stockdale et al. | ........ | 73/864.25 |
| 4,555,990 A | * | 12/1985 | Egawa | ........................ | 108/20 |
| 4,609,111 A | | 9/1986 | Astill | ........................ | 211/1.5 |
| 4,656,951 A | | 4/1987 | Kimura et al. | ................. | 108/20 |
| 4,697,778 A | | 10/1987 | Harashima | ................... | 248/349 |
| 4,752,964 A | | 6/1988 | Okada et al. | | |
| 4,753,173 A | * | 6/1988 | James | ........................ | 104/45 |
| 4,905,543 A | * | 3/1990 | Choi | ........................ | 74/827 |
| 5,080,322 A | | 1/1992 | Harley | ........................ | 248/349 |
| 5,299,075 A | * | 3/1994 | Hanks | ........................ | 360/77.02 |
| 5,337,062 A | * | 8/1994 | Sherwood et al. | ........... | 343/711 |
| 5,446,963 A | | 9/1995 | Alling | ................... | 29/898.067 |
| 5,582,112 A | * | 12/1996 | Huang | ........................ | 108/22 |
| 5,749,304 A | | 5/1998 | Turner | ........................ | 108/20 |
| 5,749,556 A | * | 5/1998 | Matsuoka et al. | ........ | 248/349.1 |
| 5,926,388 A | | 7/1999 | Kimbrough et al. | ... | 364/468.25 |
| 5,949,529 A | * | 9/1999 | Dunne et al. | ............... | 356/4.01 |

FOREIGN PATENT DOCUMENTS

DE      196 15 699      10/1997

* cited by examiner

Primary Examiner—Ramon O. Ramirez
Assistant Examiner—A. Joseph Wujciak, III
(74) Attorney, Agent, or Firm—Blakely, Sokoloff, Taylor & Zafman, LLP

(57) ABSTRACT

A method and apparatus for rotating an object. An upper unit is rotatably mounted on a base. A drive mechanism is mounted within the base so as to engage and drive rotation of the upper unit. A processor within the base controls the drive mechanism to achieve desirable acceleration characteristics during a cycle to reduce disturbances of an object rotated.

28 Claims, 8 Drawing Sheets

WIRELESS TURNTABLE

BACKGROUND OF THE INVENTION (1) Field of the Invention

The invention relates to a turntable. More specifically, the invention relates to a turntable for rotating an object to be digitized by a scanner.

(2) Background

Traditionally, scanning of three-dimensional objects have typically been performed either by rotating the scanner around the three-dimensional object or by rotating the object in front of the three-dimensional scanner. The latter system typically employs the turntable. The turntable is typically retained in fixed relation relative to the scanner so the scanner knows the precise focal point at which the scan is to be taken. Moreover, typical systems rely on the correlation between the constant speed of the turntable over time from a starting point to correlate the image captured. These factors have contributed to the unavailability of turntables suitable for scanning living three-dimensional objects.

Such turntables rotate very slowly to permit the scanning element to perform a high resolution scan or rotate relatively rapidly but still at a rate that permits the scanning elements to capture the object scanned in sufficient detail. Unfortunately, for non-rigid objects, in particular, live objects such as a human being, traditional turntable solutions are inadequate.

BRIEF SUMMARY OF THE INVENTION

A method and apparatus for rotating an object is disclosed. An upper unit is rotatably mounted on a base. A drive mechanism is mounted within the base so as to engage and drive rotation of the upper unit. A processor within the base controls the drive mechanism to achieve desirable acceleration characteristics during a cycle to reduce disturbances of an object rotated.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

Figure 1:
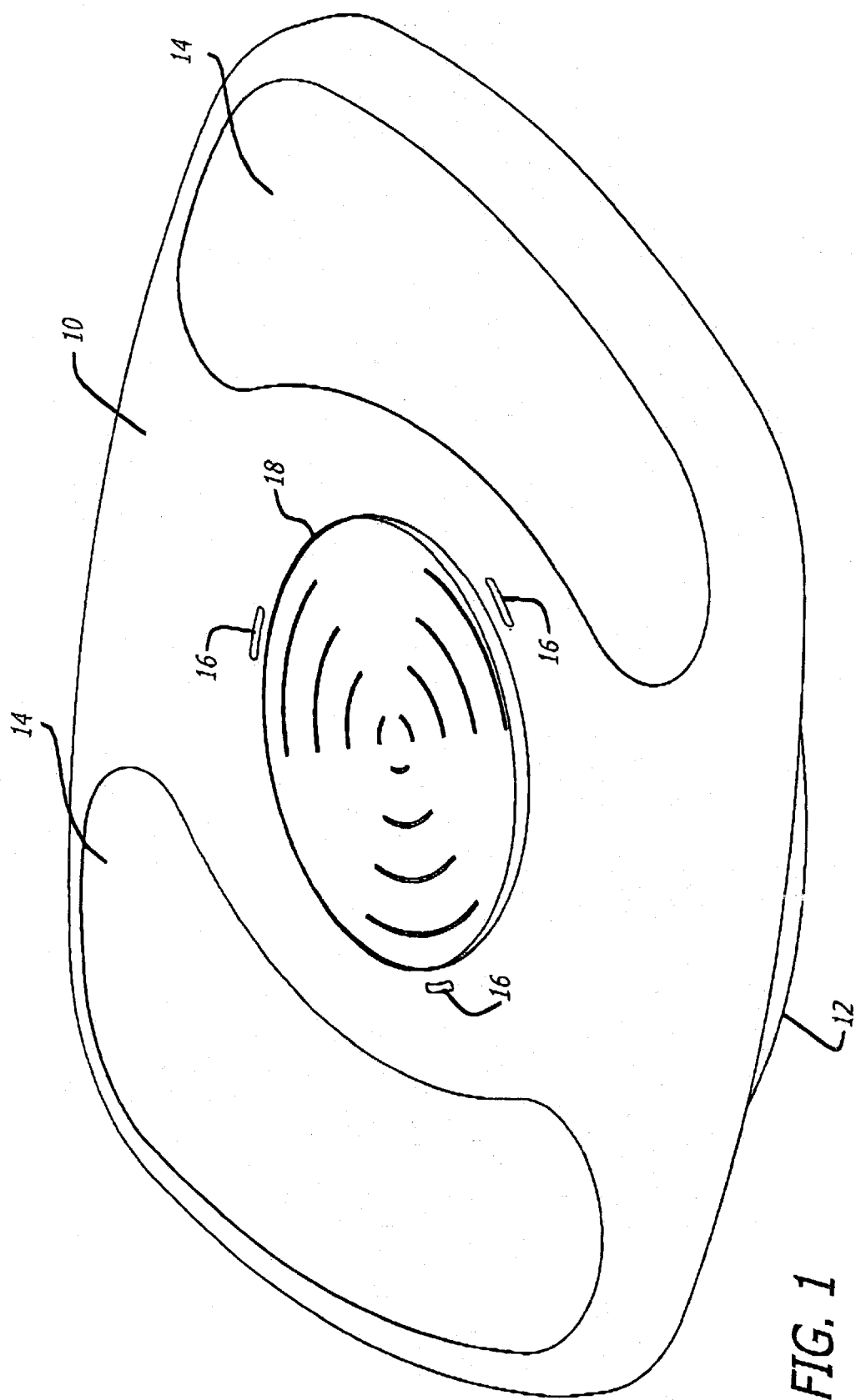
FIG. 1 is a perspective view of the turntable of one embodiment of the invention.

FIG. 1 is a perspective view of the turntable of one embodiment of the invention. Upper unit 10 is rotatably coupled to base 12. Upper unit 10 is alternatively referred to as the "platform." Upper unit 10 may be substantially planar and may provide indentations 14 suitable for placement of the user's foot, for example. Additionally, upper unit 10 may define the plurality of stanchion attachment point 16. A stanchion might be used where a non-rigid or unusually-shaped three-dimensional object is to be scanned. In one embodiment, the stanchion may be a tripod with various extendible arms. Upper unit 10 may also define a focus pattern 18 to permit a scanner to locate the focal plane based on the pattern on the surface of upper unit 10. Upper unit 10 and base unit 12 may be molded out of glass filled acrylonitrile-butidiene-styrene (ABS), a thermoplastic, or may be manufactured out of metal or some other suitably rigid material base on the expected load. Generally, glass filled ABS has been found to have suitable rigidity and relatively low cost of loads up to 300 pounds.

Figure 2:
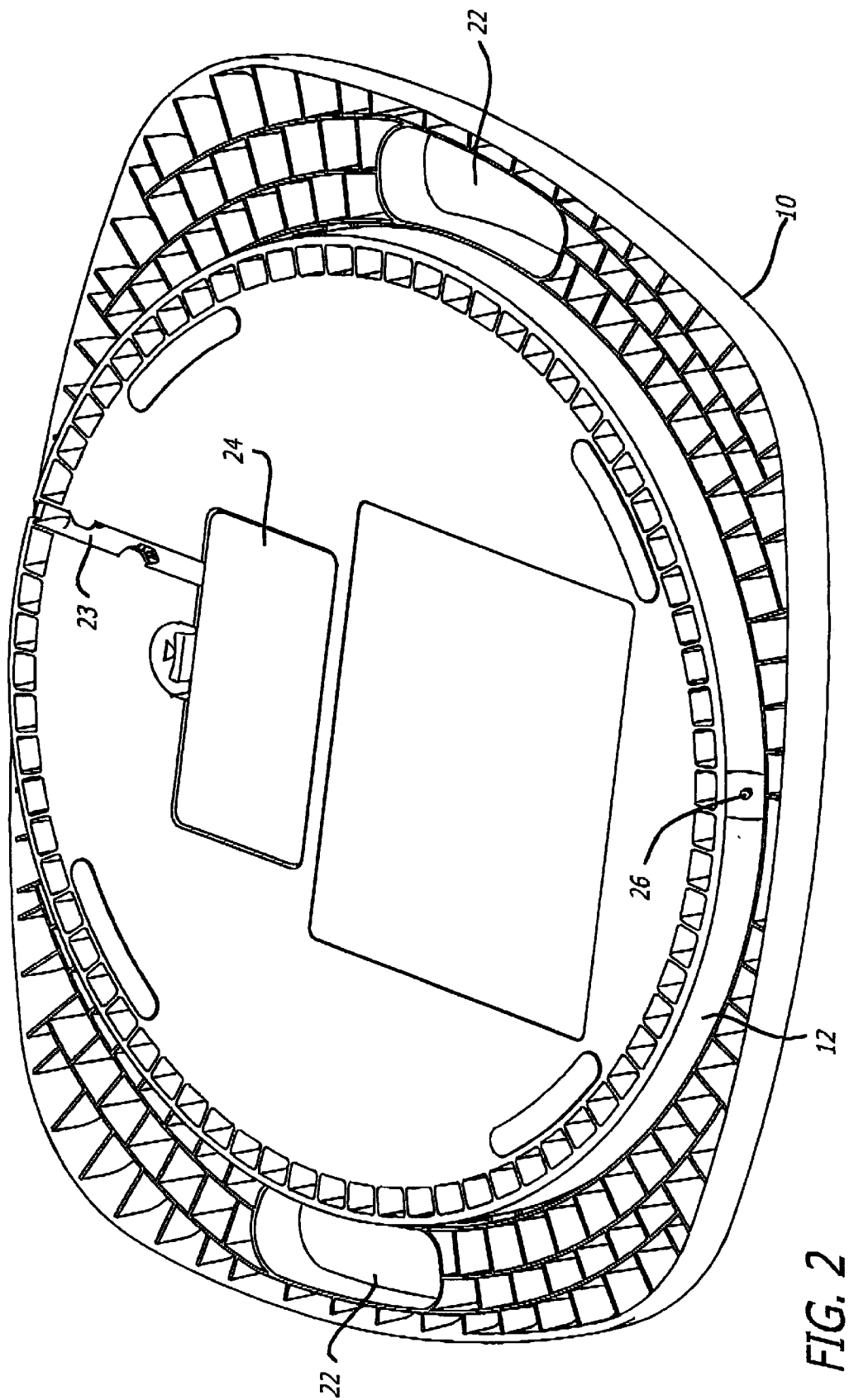
FIG. 2 is a bottom perspective view of a turntable of one embodiment of the invention.

FIG. 2 is a bottom perspective view of a turntable of one embodiment of the invention. Upper unit 10 may be molded to define handles 22 while other portions of the undersurface of upper unit 10 may have a rigidity enhancing cellular structure to increase rigidity and strength of the upper unit. The base 12 is coupled to the upper unit so that the upper unit 10 can rotate about an axis. The base also defines a battery compartment sealed off by battery door 24. A cord track 23 is molded as part of the base to provide a track for a power cord when an AC adaptor is to power the turntables instead of batteries. The base also provides a signaling port 26 through which wireless signaling, for example, infrared (IR) is conducted. In another embodiment radio signaling may be conducted. In such an embodiment, a physical port is unnecessary, rather, the radio signaling may rely on an internal antenna mounted within the base.

Figure 3:
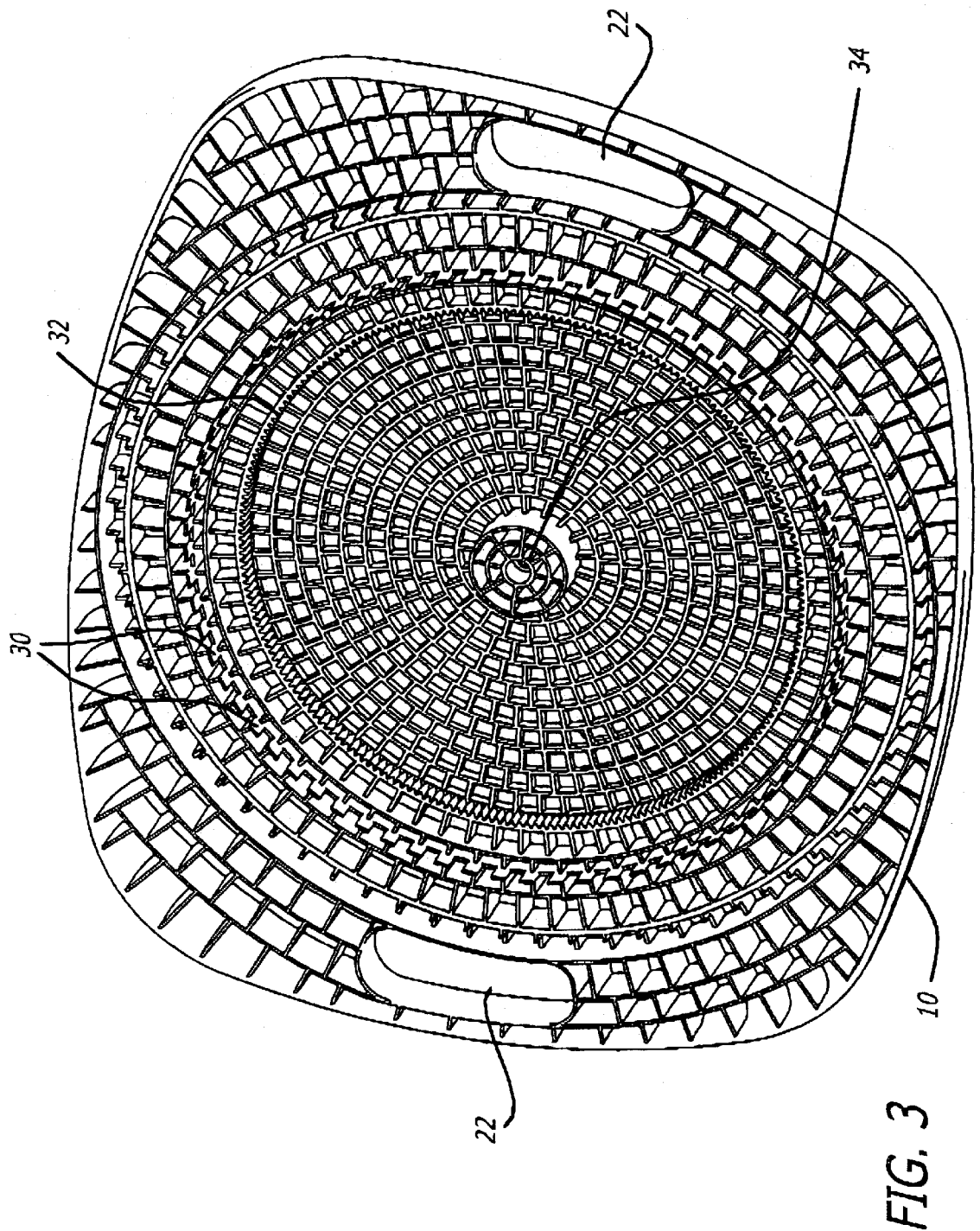
FIG. 3 is a bottom view of the upper unit removed from the base.

FIG. 3 is a bottom view of the upper unit removed from the base. In addition to the cell structure and the handles 22, the upper unit 10 can be molded to define a major drive gear 32 which can be used to drive the rotation of the upper unit. A positioning blades 30 may also be molded as part of upper unit 10. Sensing of the positioning blades allows the processor in the base of the turntable to identify an angular orientation of the upper unit and detect clutching events. Rotation post 34 is molded as part of upper unit 10 and defines the axis of rotation of the upper unit. A low friction washer may be employed concentric with the rotation post 34 to reduced deflection of the upper surface of the upper unit 10 without an unacceptable increase in frictional resistance during rotation.

Figure 4:
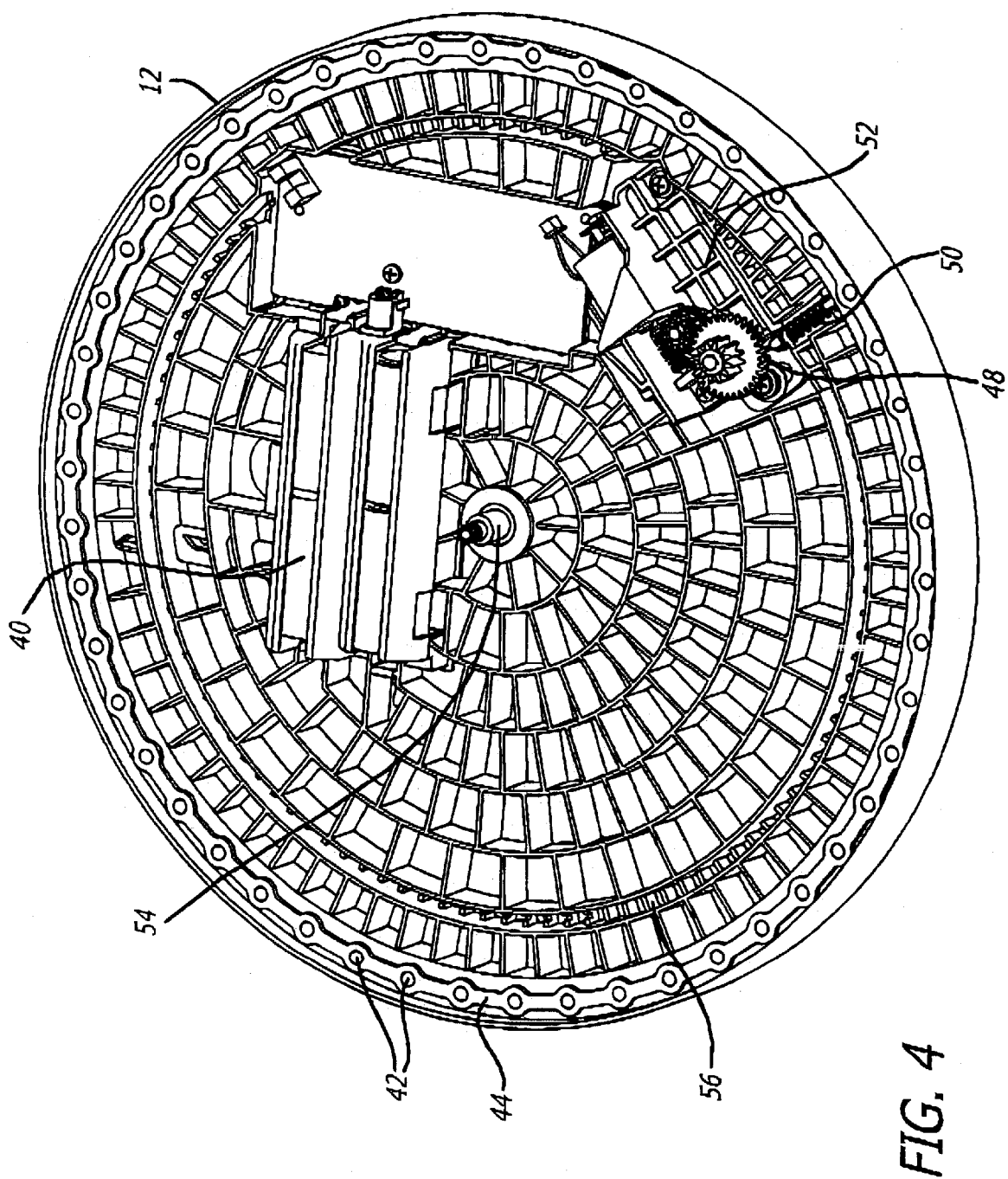
FIG. 4 is a perspective view of the base unit of one embodiment of the invention.

FIG. 4 is a perspective view of the base unit of one embodiment of the invention. The base 12 defines a battery compartment 40 which in one embodiment of the invention holds four C-cell batteries. The batteries provide the power supply for the internal electronics of the turntable as well as a DC motor 46 which is mounted within the base 12. A power jack is also mounted within the base 12. An external adapter in conjunction with, e.g., a wall outlet may be used as a power source instead of the batteries.

DC motor 46 is mounted on a gear box 52 which in turn is pivotally coupled to the base 12. Also mounted on gear box 52 is a gear assembly 48. Gear box 52 couples to a bias spring 50. Bias spring 50 is coupled between a peripheral region of the base and the gear box 52. Rotation axis 54, which may be a shoulder screw in one embodiment of the invention, is also coupled to the base 12 and provides the point of rotation for the upper unit. Base 12 defines internal cellular structure for rigidity and strength as well as the ball-bearing race into which ball bearings 42 may be placed to provide easier rotation of the upper unit and load spreading.

A ball bearing cage 44 can be manufactured out of plastic and spaces the ball bearings so that the load is spread and fewer ball bearings need be used to fill the race. In one embodiment, ball bearing cage 44 captures the ball bearings so that the cage 44 and ball bearings may be handled as a unit to ease assembly. To achieve this, in one embodiment, the manufactured plastic cage 44 defines receptacles for the ball bearings having retention teeth on one side and a lip on the other side. After insertion of the ball bearings, the lip may be cold pressed to form a retention ring on the second side of the cage 44. Alternatively, the cage 44 may be cold pressed before insertion of the ball bearings and then the ball bearings snapped into each receptacle. In one embodiment, fifty ball bearings are used to fill a 250 ball bearing race and provide sufficient support for weights in excess of 300 pounds. Base 12 further defines a travel path 56 for the positioning blades within the cell structure.

Figure 5:
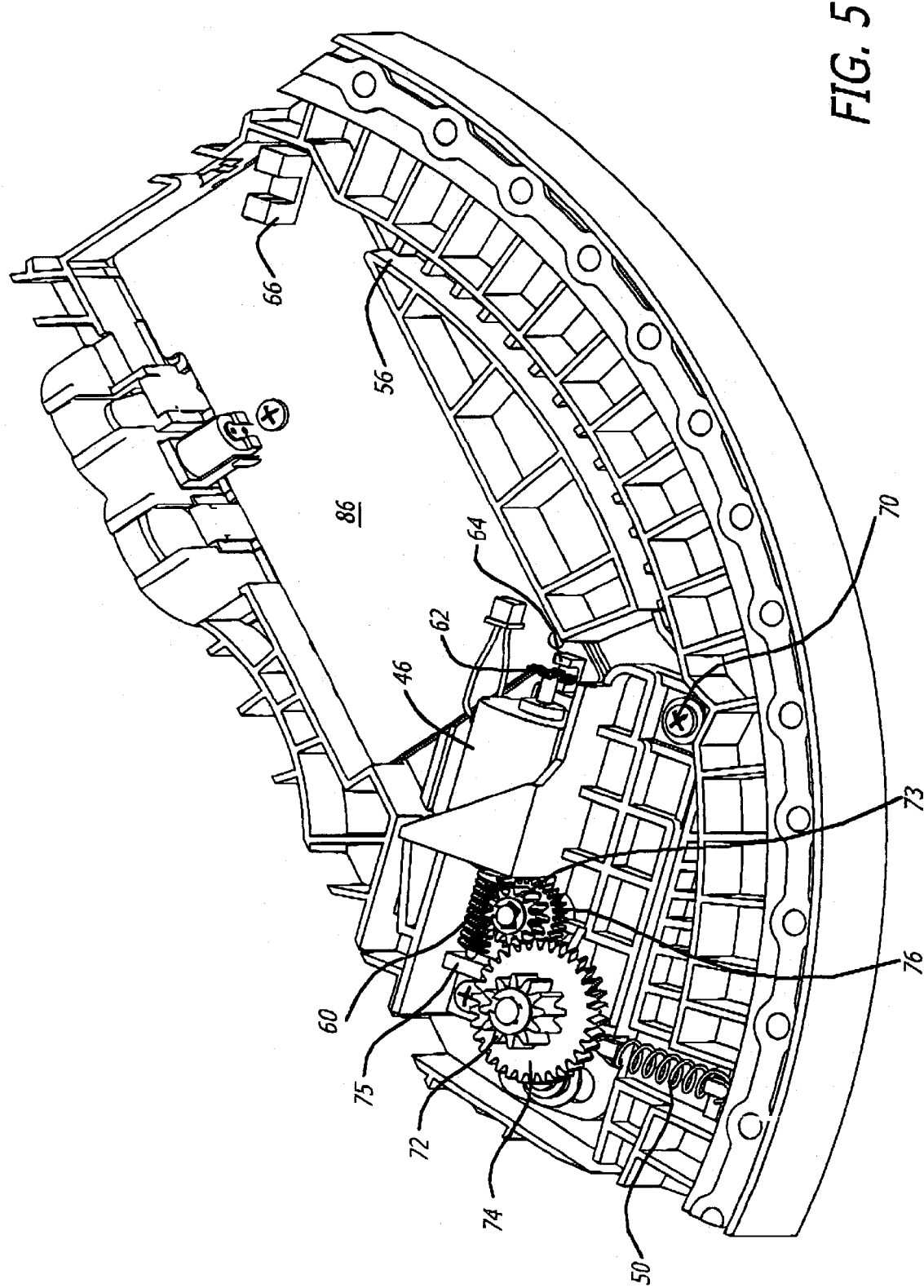
FIG. 5 is an enlarged view of a portion of the base in one embodiment of the invention.

FIG. 5 is an enlarged view of a portion of the base in one embodiment of the invention. Gear box 52 on which motor 46 and gear assembly 48 is mounted, is pivotally coupled to the base at pivot point 70. An opposing end of the gear box 52 is coupled to biasing spring, which is also coupled to an outer portion of the base. Bias spring 50 causes compound gear 72 to engage the major drive gear in the upper unit. The lower gear 74 of compound gear 72 is driven by a compound gear 73 having a worm wheel 76, which in turn is driven by a worm 60 mounted to the motor shaft of motor 46. A stop 75 is molded as part of gear box 52 to prevent the motor shaft and worm 60 from coming out. In one embodiment, the gear ratio from motor 46 to the major drive gear is 1400.

The particular gear arrangement shown has been found to have-certain desirable characteristics that reduce friction and noise when the turntable is loaded and accounts for human factors. The friction and noise reduction is primarily a result of the worm 60 pulling in and therefore not engaging the stop 75 during normal operation. Particularly, worm 60 is a right-handed worm. Similarly, worm wheel 76 is a right-handed worm wheel. In this configuration, causing the motor 46 to drive the worm 60 in a clockwise direction causes the motor shaft to pull in when loaded. Additionally, the worm wheel 76 is pulled down under load. These features taken together reduce friction and the risk of disengagement of the gears in the gear assembly. Finally, the upper unit rotates clockwise, which is consistent with human expectation and reduces the risk of jostling a living subject rotated by the turntable.

The bias spring 50 in conjunction with the pivotal connection at pivot point 70 creates a clutching function between gear 72 and the major drive gear of the upper unit. Additionally, the spring bias takes out inconsistencies related to manufacturing imprecision or wear on the teeth of the major gear. The clutching function further permits less expensive gears to be used as it reduces the risk of teeth breakage. The clutching function occurs when a force is applied in either the forward or reverse direction greater than the spring force. When clutching occurs, gear 72 will disengage from the major drive gear of the upper unit as gear box 52 pivots away from such engagement. By appropriately selecting the spring and the angle of pivot of the gear box, risk of gear damage by back driving the upper unit rotation is minimized. In one embodiment, the angle of pivot is given by $\sin\theta = r/l$, where l is the length of pivot arm, r is the pitch radius of the compound gear 72 and $\theta$ is the angle defined by the pivot arm and a perpendicular to a radius drawn through the axis of rotation of compound gear 72.

Also coupled to the motor shaft is a fan 62. In one embodiment, fan 62 has a plurality of blades, each equally spaced. An optical sensor such as photo interrupter 64 is positioned on circuit board 86 such that the blades of the fan are detected as the motor rotates it through the photo interrupter 64. In this manner using the described gear assembly, the rotation of the upper unit can be closely controlled using small and inexpensive gears while the angular displacement can be detected to a high degree of accuracy based on the revolutions of the fan blade.

Also mounted on circuit board 86 is a second optical sensor such as photo interrupter 66 disposed so as to be along the positioning blade travel path 56. Accordingly, the plurality of positioning blades defined by the upper unit trigger the optical sensor 66. The positioning blades make possible detection of clutching events in less than a complete revolution. Detection of clutching events is discussed below with reference to FIG. 6a. The optical sensors 64 and 66 signal a microprocessor (not shown) that may also be mounted on circuit board 86. The microprocessor conducts wireless signaling to signal an external device such as a digitizer through a wireless interface.

Figure 6A:
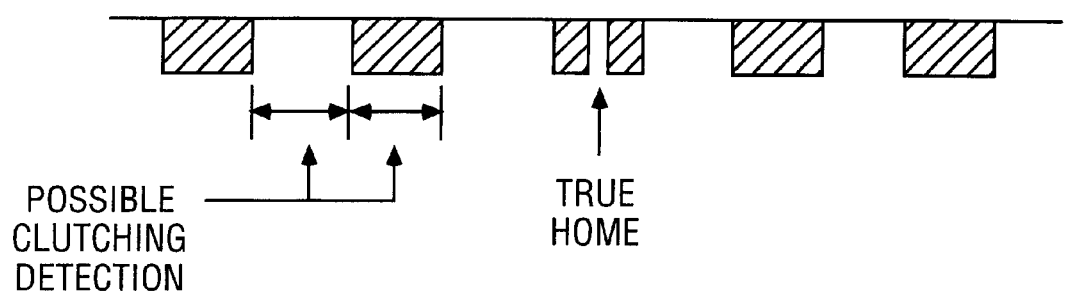
FIG. 6a shows a schematic diagram of a portion of the upper unit.

FIG. 6a shows a schematic diagram of a portion of the upper unit. A plurality of blades are uniformly spaced around a circle defined on the upper unit corresponding to the positioning blade travel path in the lower unit. This plurality permits the positioning blade sensor to detect the passage of each blade. If a blade, as detected by the sensor and correlated by the interrupter sensing the fan motion on the motor shaft, is longer or shorter than expected, it can be determined that a clutching event occurred. Both the blade condition and the non-blade condition provide opportunities to detect clutching. Generally, all blade conditions should have the same length and all non-blade conditions should have the same length, absent clutching. By virtue of this correlation, it is possible to both detect clutching events and to account for them in the digitizing of a rotated object. One home blade (or pair of blades) defines the true home position for the upper unit. In one embodiment, as an exception to the general rule above, these blade(s) can be detected by making them shorter in width than the other positioning blades distributed around the circumference of the rotation path.

Figure 6B:
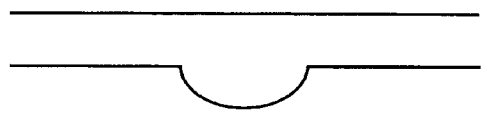
FIG. 6b shows a cross section of the ball bearing race of one embodiment of the invention.

FIG. 6b shows a cross section of the ball bearing race of one embodiment of the invention. While typical ball bearing races have opposing cups, ball bearing race as shown in FIG. 6b has a lower cup in which the ball bearings rest and a flat upper surface which rides on the ball bearings. This arrangement has been found effective to reduce tolerance and fit constraints.

Figure 6C:
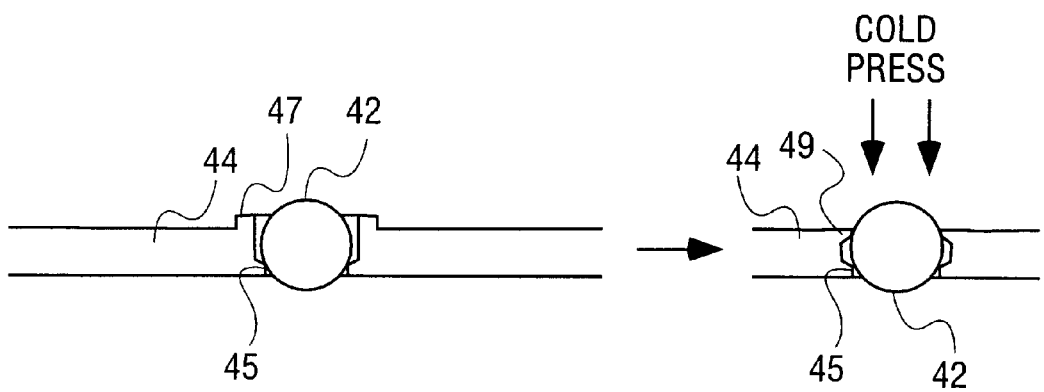
FIG. 6c is a schematic diagram of a retention slot of the ball bearing cage of one embodiment of the invention.

FIG. 6c is a schematic diagram of a retention slot of the ball bearing cage of one embodiment of the invention. The ball bearing cage 44 may be formed of plastic to define a lower retention ring 45 on the lower surface and a lip 47 on the upper surface. Ball bearing 42 is then deposited into the receptacle. Once the ball bearing is in place, the upper surface is cold pressed, thereby mashing down lip 47 to form an upper retention ring 49 that holds the ball bearings within the ball bearing cage. In this manner, the ball bearing cage and its full complements of ball bearings may be handled as a single unit. Alternatively, as indicated above, the cold pressing can be performed before insertion of the ball bearing with the same ultimate effect. Significantly, while the upper retention ring 49 and lower retention ring 45 prevent the ball bearing from falling out of the ball bearing cage, they do not inhibit its movement or its support function in the apparatus.

Figure 7:
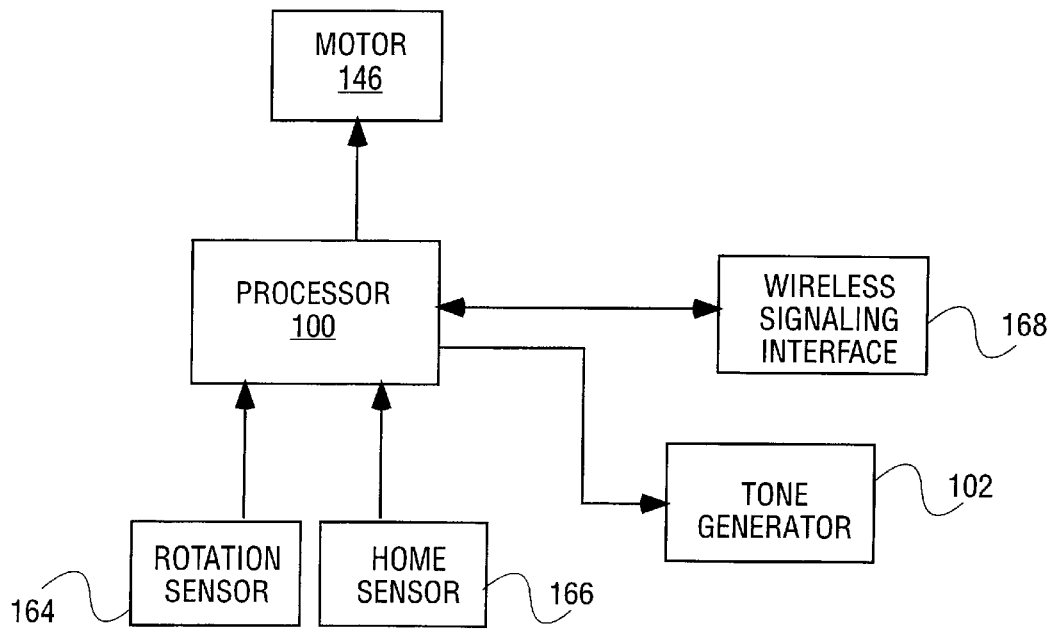
FIG. 7 is a block diagram of the motor control system of one embodiment of the invention.

FIG. 7 is a block diagram of the motor control system of one embodiment of the invention. Processor 100 receives input from a rotation sensor 164 and a home sensor 166 which together define the angular orientation of the upper unit. The processor 100 also receives signals via the wireless signaling interface 168 from a remote signal source (not shown). In one embodiment, the processor may be an 8-bit microcontroller sold as part no. P1C16C505-04/SL available from MicroChip Technology, Inc. of Phoenix, Ariz. The microcontroller includes an on board clock so no crystal needs to be supplied within the turntable, thereby holding costs down. However, the clock is not especially exact. Clock adjustment may be accomplished based on external signaling to ensure frequency match between the turntable and its external master.

The signal arrives from the wireless signaling interface 168 instructing the processor to begin rotation of the upper unit. The processor drives tone generator 102 to produce an audible tone signaling that the processor is about to initiate an increase of angular acceleration of the upper unit. The processor then causes motor 146 to begin driving the gear assembly. The processor will typically cause the motor to increase the rotation speed gradually to reduce the risk of jostling a scan subject. The processor continually receives signals from the rotation sensor from which it can derive angular orientation of the upper unit. The processor forwards an indication of the angular orientation across the wireless signaling interface to a remote external device. When the positions blade sensor 166 signals the processor that the upper unit is again in the home position, a complete rotation has been achieved. The processor 100 may then power down the motor 146 gradually to avoid jostling an object on the upper unit. The processor may also receive a signal from a voltage detector (not shown) that detects the strength of the batteries. The processor may then signal a user when a battery low condition exists. Additionally, the processor may signal tone generator 102 to generate a tone indicating that angular deceleration is about to occur or motion has completed. These audible tones are expected to facilitate the ability of living specimens to avoid movement during rotation.

Figure 8:
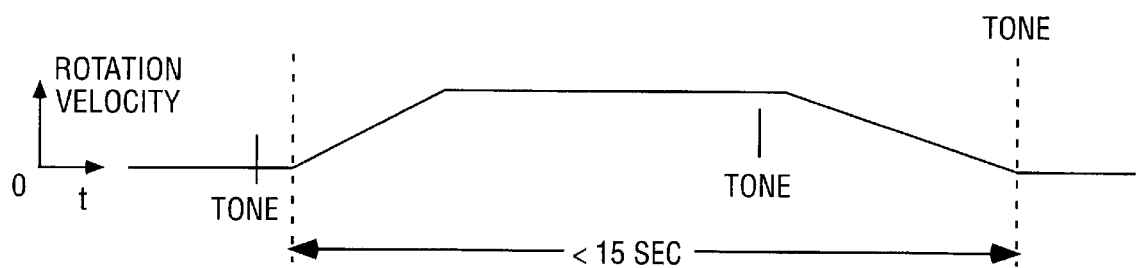
FIG. 8 is a diagram of an angular acceleration profile in one embodiment of the invention.

FIG. 8 is a diagram of an angular acceleration profile in one embodiment of the invention. An audible tone is generated before the-turntable begins to ramp up its rotational velocity. By slowly increasing the rotation speed, jostling of a possible scan subject is reduced. Additionally, the audible tone further allows a living subject to prepare for the commencement of motion. A second tone may be generated before the turntable begins to decelerate. The turntable will typically complete slightly more than one rotation from beginning motion to ending motion. This helps to ensure that only one inclusive set of scan data is obtained. In one embodiment, the complete motion cycle is less than 15 seconds in duration. This time frame has been found to be short enough that living subjects can remain still enough that suitable scans can be generated.

While one suitable profile is shown, numerous other profiles may be employed by the turntable. For example, if the scanner can sweep back and forth through an arc, another suitable profile may be a profile in which the turntable moves to a plurality of predetermined points (such as 90° increments) stopping at such points for a scan time. In such case, scanning only occurs when the turntable is stopped. In such an embodiment, this signaling of the angular orientation may be continuous with receipt of each subsequent fan event or only periodically. An example of such periodic reporting would be reporting only after motion stops such as with a profile having four 90° rotations. This reduces the information that must be sent from the turntable to the scanner. Such profiles may be retained for example as firmware within the turntable, or could be signaled in from a remote device such as the scanner. One such scanner is described in co-pending application Ser. No. 09/660,809 entitled DIGITIZER USING INTENSITY GRADIENT TO IMAGE FEATURES OF THREE-DIMENSIONAL OBJECTS.

Figure 9:
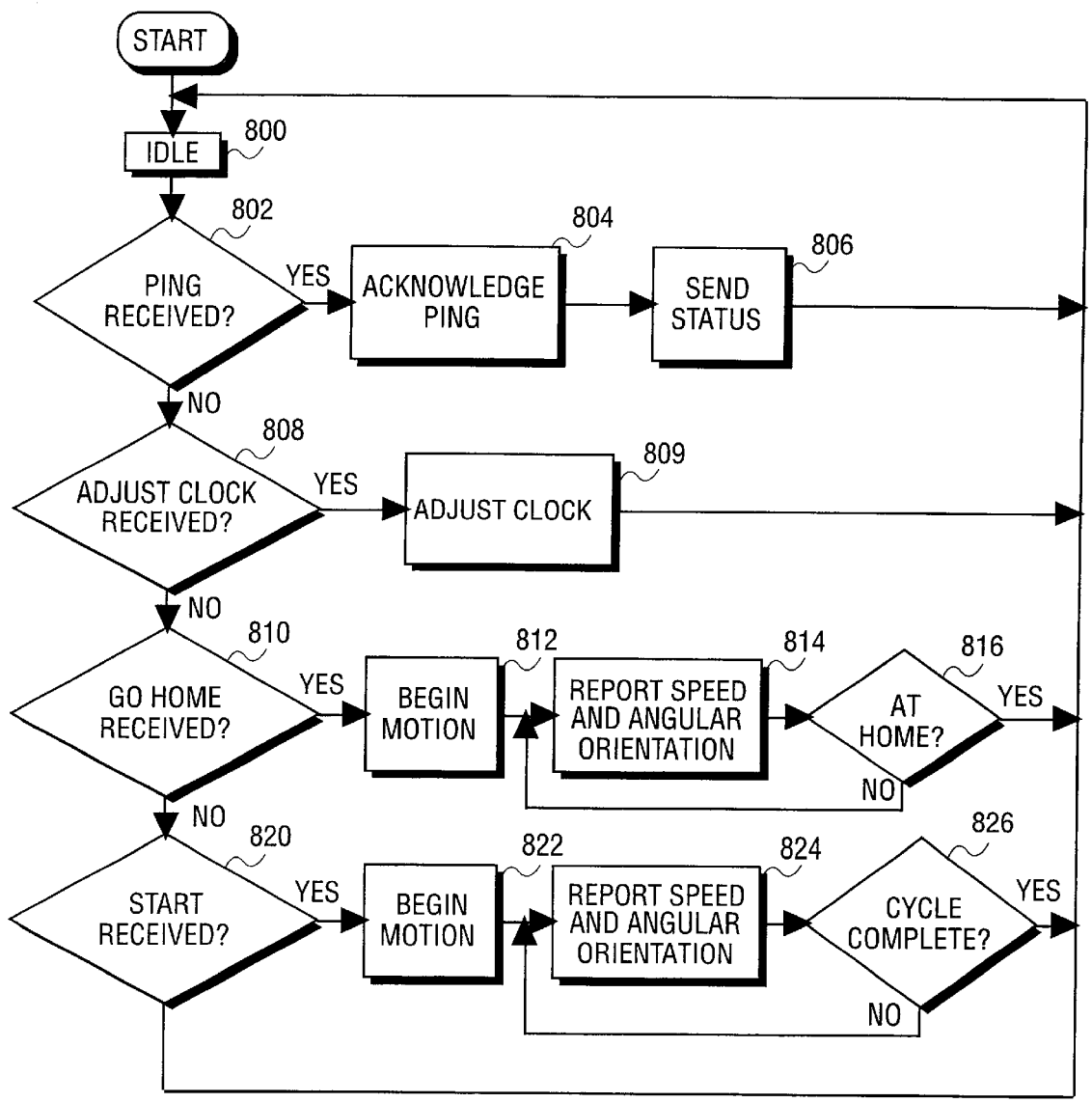
FIG. 9 is a flow diagram of signaling at the turntable in one embodiment of the invention.

FIG. 9 is a flow diagram of signaling at the turntable in one embodiment of the invention. The turntable is in idle state at functional block 800 waiting for a command from the external device. Once a command is received, the turntable identifies what type of command was received and acts on the command as described below.

A determination is made at decision block 802 if a ping signal has been received from an external source. If a ping is received at decision block 802, the turntable acknowledges the ping at functional block 804. The ping has the effect of awakening the turntable while the acknowledge signal assists the remote source in identifying the presence and location of the turntable At functional block 806 status data including, for example, a turntable software revision number, operating flags such as battery low, at home, going home, in motion, stalled or clutched, as well as current position data, fan events per revolution, and a check sum may be sent from the turntable to the remote source.

If the received command is not a ping, a determination is made at decision block 808 if a signal to adjust the clock has been received from the remote source, (the remote source determines if adjustment is necessary). If the clock is not okay, a clock adjust signal is received and the clock is adjusted to improve synchronization with the external devices communicating with the turntable at functional block 809. After adjustment the system returns to the idle 800.

If the receive command is not a clock adjustment command, a determination is made at decision block 810 whether a home signal has been received. If the home signal has been received, the turntable initiates motion to return it to a home position at functional block 812. The turntable, concurrently, sends position data and status information at functional block 814 until it arrives at a home position.

If the command is not a home command, a determination is then made at decision block 820 that a start signal has been received. If a start signal has been received, motion begins at 822. Motion continues and the turntable transmits speed and angular orientation information at functional block 824. A determination is made at decision block 826 if the cycle is complete. If the cycle is not complete, it continues to report speed and angular displacement information over the wireless link at functional block 824. If the cycle is complete, it returns to idle state 800 waiting for the next series of commands. While the diagram is shown checking for commands in a particular order from the idle state, any order is within the scope and contemplation of the invention.

In one embodiment, the speed and angular displacement information reported at functional block 814 and 824 is merely a signaling each time the fan blade eclipses a photo interrupter. By using a count such as FF, FE, FC, F8, FF, FE, FC, F8 . . . the receiver can detect and correct the absence of up to three messages. Since the receiver has already received initial position information from the counts received it is able to easily calculate both the angular displacement and speed of the turntable. Alternatively, the angular displacement may be reported only at the end of the motion.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A turntable comprising:
a base;
a platform rotatably supported on the base;
a motor within the base;
a drive assembly driven by the motor to drive rotation of the platform relative to the base; and
a processor within the turntable coupled to the motor to monitor an angular displacement and to control an angular acceleration of the platform.

2. The turntable of claim 1 further comprising:
a sensor to detect revolutions of the motor, the sensor to communicate an indication of the revolutions to the processor.

3. The turntable of claim 1 further comprising:
a wireless signaling interface through which the processor may one of send data to and receive data from a remote device.

4. The turntable of claim 1 further comprising:
a local clock circuit coupled to the processor; and
a clock adjust circuit to adjust the local clock responsive to a signal from a remote device.

5. The turntable of claim 1 wherein the turntable has one of physical indicia and a signal source to permit location of the turntable by a remote device.

6. The turntable of claim 1 wherein the processor causes an audible tone to be generated prior to a change in angular displacement of the platform.

7. The turntable of claim 1 wherein the processor controls an angular acceleration to be applied by the motor such that the angular acceleration ramps gradually from a first velocity to a second velocity to avoid disturbance of an object on the turntable.

8. The turntable of claim 1 further comprising:
a sensor to detect when the platform is in a known position.

9. The turntable of claim 1 further comprising:
a sensor to detect an amount of angular displacement of the platform relative to a prior position.

10. The turntable of claim 1 further comprising:
a self contained power source.

11. The turntable of claim 1 wherein the turntable rotates greater than 360° in a rotation cycle.

12. The turntable of claim 1 wherein rotation comprises a sequence of angular displacement versus time that is variable and controlled by the processor.

13. The turntable of claim 1 wherein the platform defines at least one engagement feature for mounting an object positioning fixture on a surface of the platform.

14. The turntable of claim 1 further comprising:
a plate pivotally coupled to the base and having the motor and drive assembly mounted thereon; and
a spring coupled to the plate and a point on the base to bring the drive assembly into engagement with the platform.

15. The turntable of claim 14 wherein the spring and the plate in combination perform a clutching feature.

16. The turntable of claim 14 wherein the plate and spring in combination bias the drive assembly into engagement with the platform to compensate for platform shape distortions.

17. The turntable of claim 1 wherein the drive assembly resists backdriving.

18. The turntable of claim 1 wherein the platform is formed of a single piece of material having integral features to engage the drive assembly.

19. A turntable comprising:
a base;
a platform rotatably supported on the base;
a motor within the base;
a drive assembly driven by the motor and to engage the platform to drive rotation of the platform relative to the base;
a plate pivotally coupled to the base and having the motor and drive assembly mounted thereon; and
a spring coupled to the plate and a point on the base to bring the drive assembly into engagement with the platform,
wherein the turntable has one of physical indicia and a signal source to permit location of the turntable by a remote device.

20. A turntable comprising:
a base;
a platform rotatably supported on the base;
a motor within the base;
a drive assembly driven by the motor and to engage the platform to drive rotation of the platform relative to the base;
a plate pivotally coupled to the base and having the motor and drive assembly mounted thereon;
a spring coupled to the plate and a point on the base to bring the drive assembly into engagement with the platform;
a right hand worm;
a first compound gear having a right hand worm wheel engaging the right hand worm; and
a second compound gear driven by the first compound gear.

21. A turntable comprising:
a base;
a platform rotatably supported on the base;
a motor within the base;
a drive assembly driven by the motor and to engage the platform to drive rotation of the platform relative to the base;
a plate pivotally coupled to the base and having the motor and drive assembly mounted thereon;
a spring coupled to the plate and a point on the base to bring the drive assembly into engagement with the platform,
wherein the platform defines at least one engagement feature for mounting an object position fixture on a surface of the platform.

22. A method comprising:
commencing rotation of a platform of a turntable responsive to a first signal;
controlling an acceleration of the angular displacement of the platform;
detecting within the turntable an indication of position relative to a known position; and
transmitting the indication to an external recipient.

23. The method of claim 22 further comprising:
generating an audible tone prior to changing an angular displacement.

24. The method of claim 22 wherein detecting comprises:
sensing revolutions of a motor; and
signaling a processor with a number of revolutions.

25. The method of claim 22 comprising:
moving the platform in a sequence of angular displacements versus time in a controlled manner.

26. The method of claim 25, wherein the sequence is predefined and is one of stored within the turntable and wirelessly signaled to the turntable.

27. The method of claim 22 wherein the transmitter is wireless.

28. The method of claim 22 further comprising:
adjusting a local clock responsive to a clock adjust signal received from a remote device.

* * * * *